Sept. 25, 1923.
A. F. ANDERSEN
1,468,622
SALVAGE APPARATUS FOR RAISING SUNKEN VESSELS
Filed Aug. 10, 1922    6 Sheets-Sheet 1
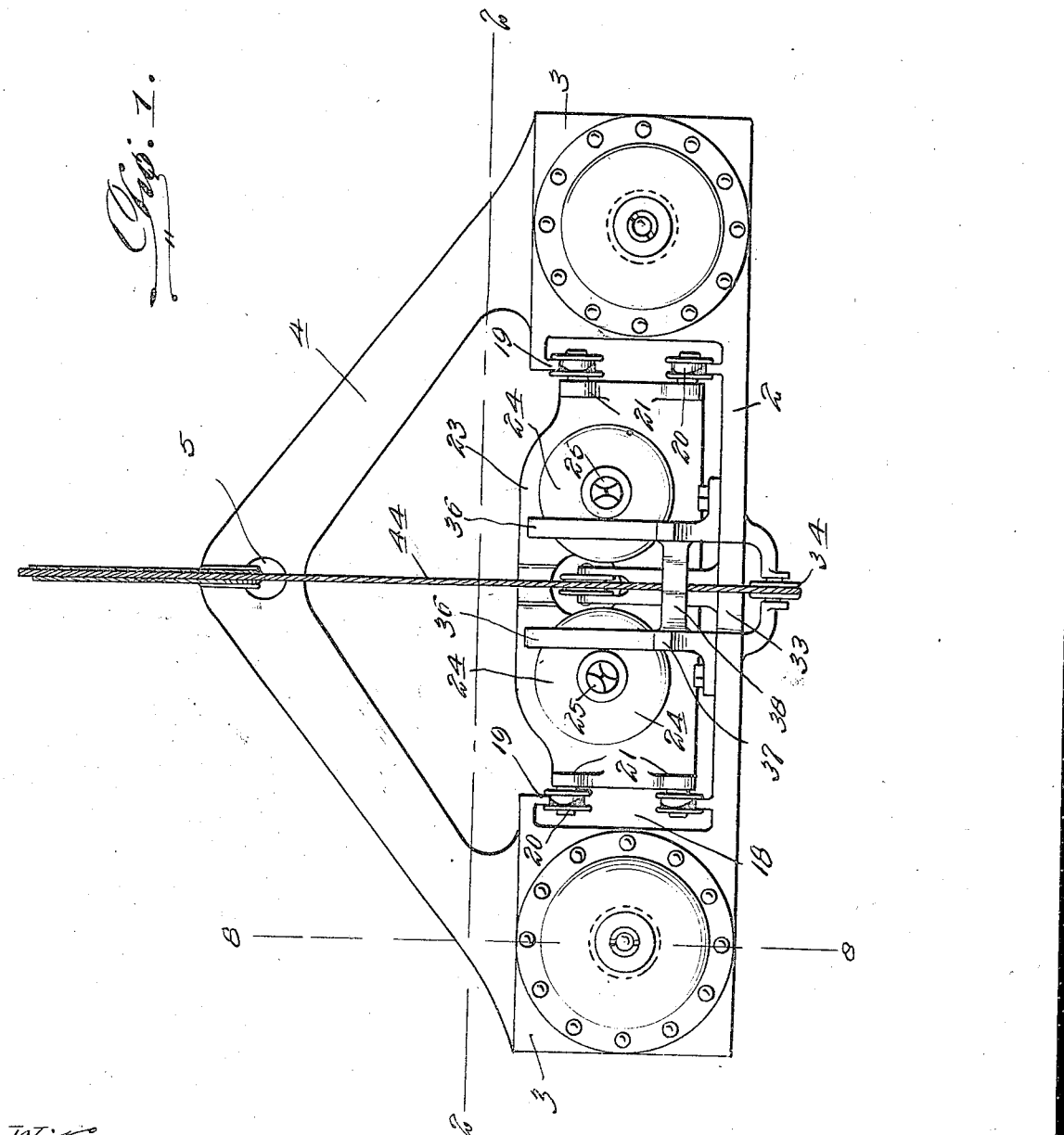

Sept. 25, 1923.
A. F. ANDERSEN
1,468,622
SALVAGE APPARATUS FOR RAISING SUNKEN VESSELS
Filed Aug. 10, 1922   6 Sheets-Sheet 2
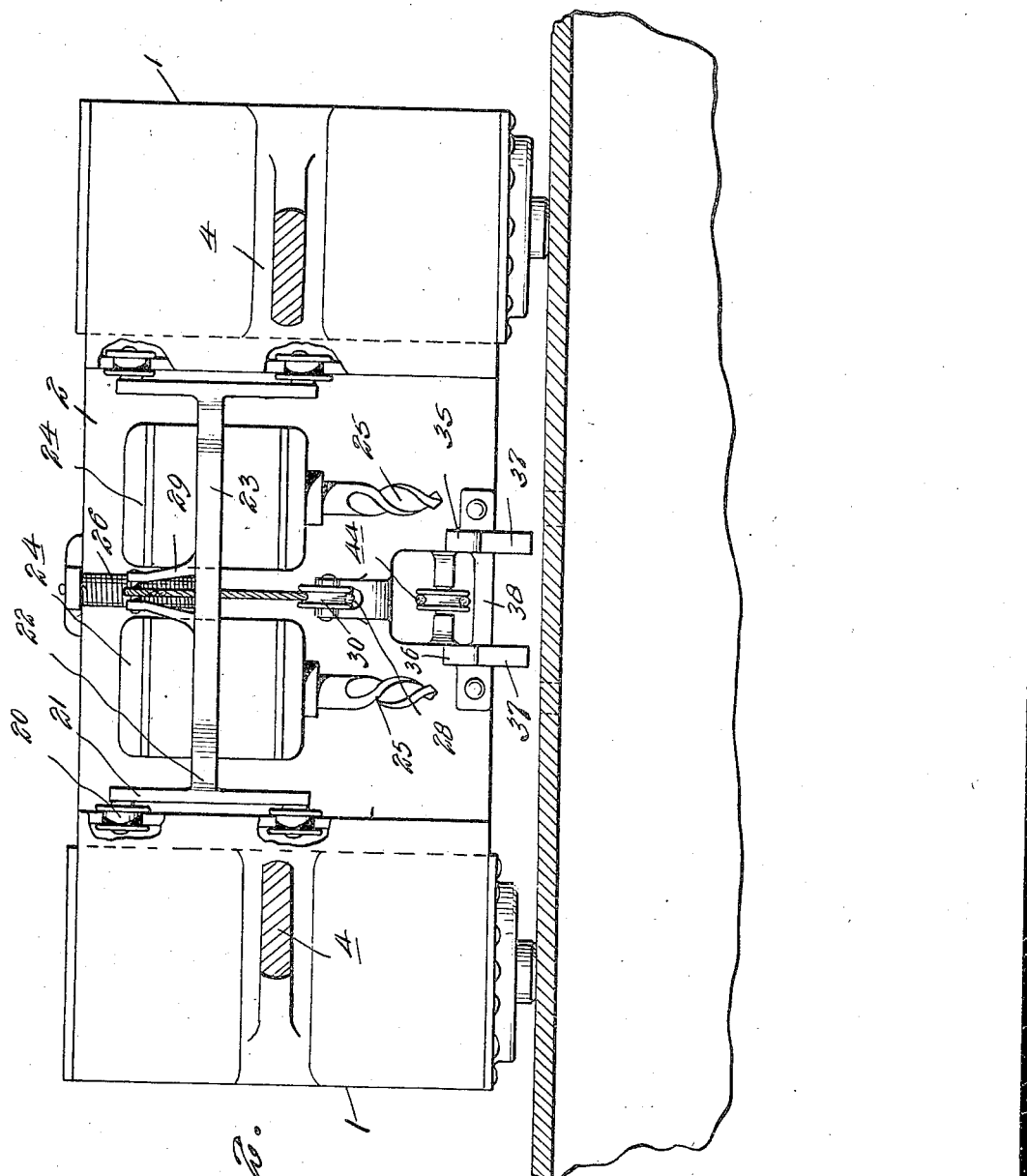

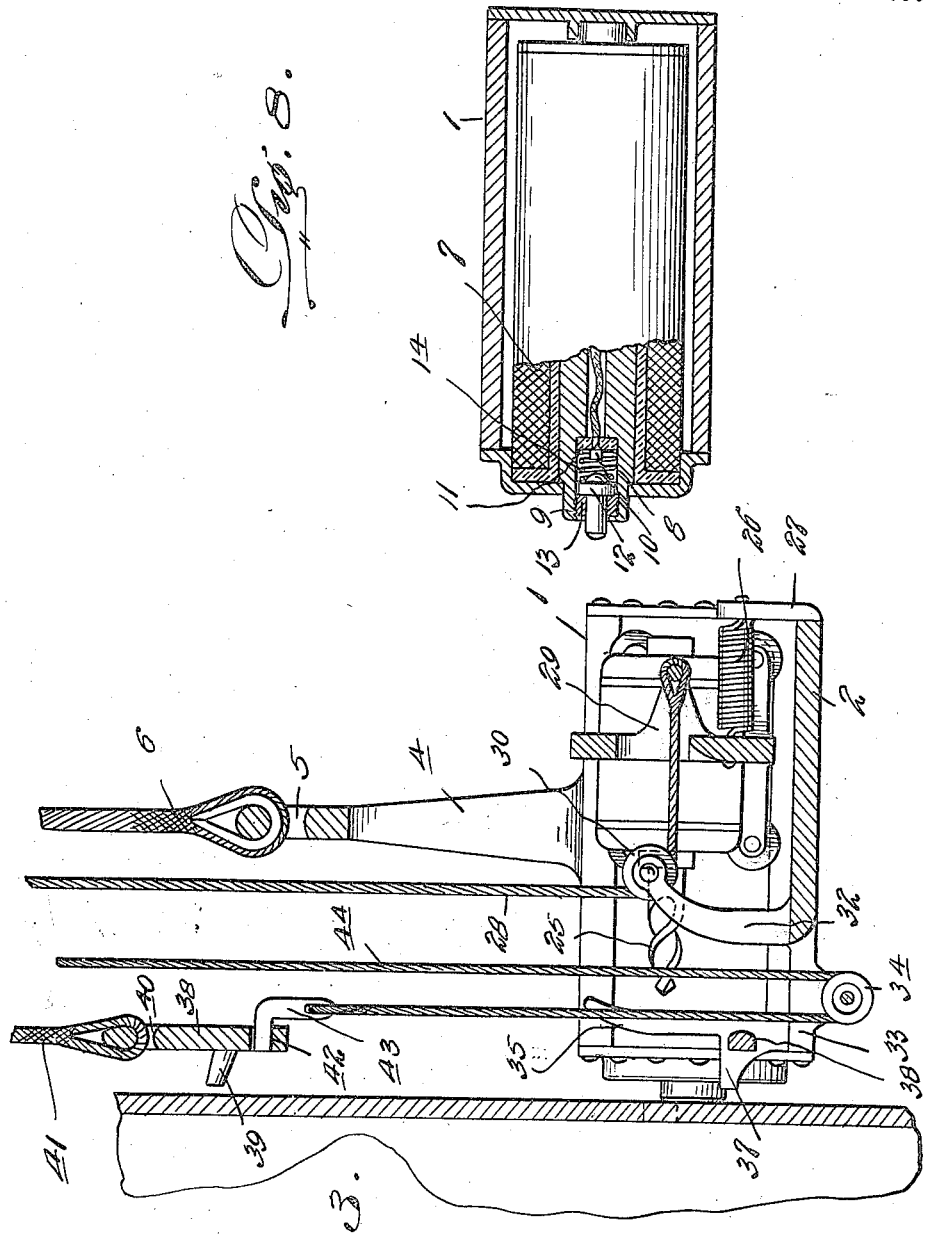

Sept. 25, 1923.
A. F. ANDERSEN
1,468,622
SALVAGE APPARATUS FOR RAISING SUNKEN VESSELS
Filed Aug. 10, 1922   6 Sheets-Sheet 4
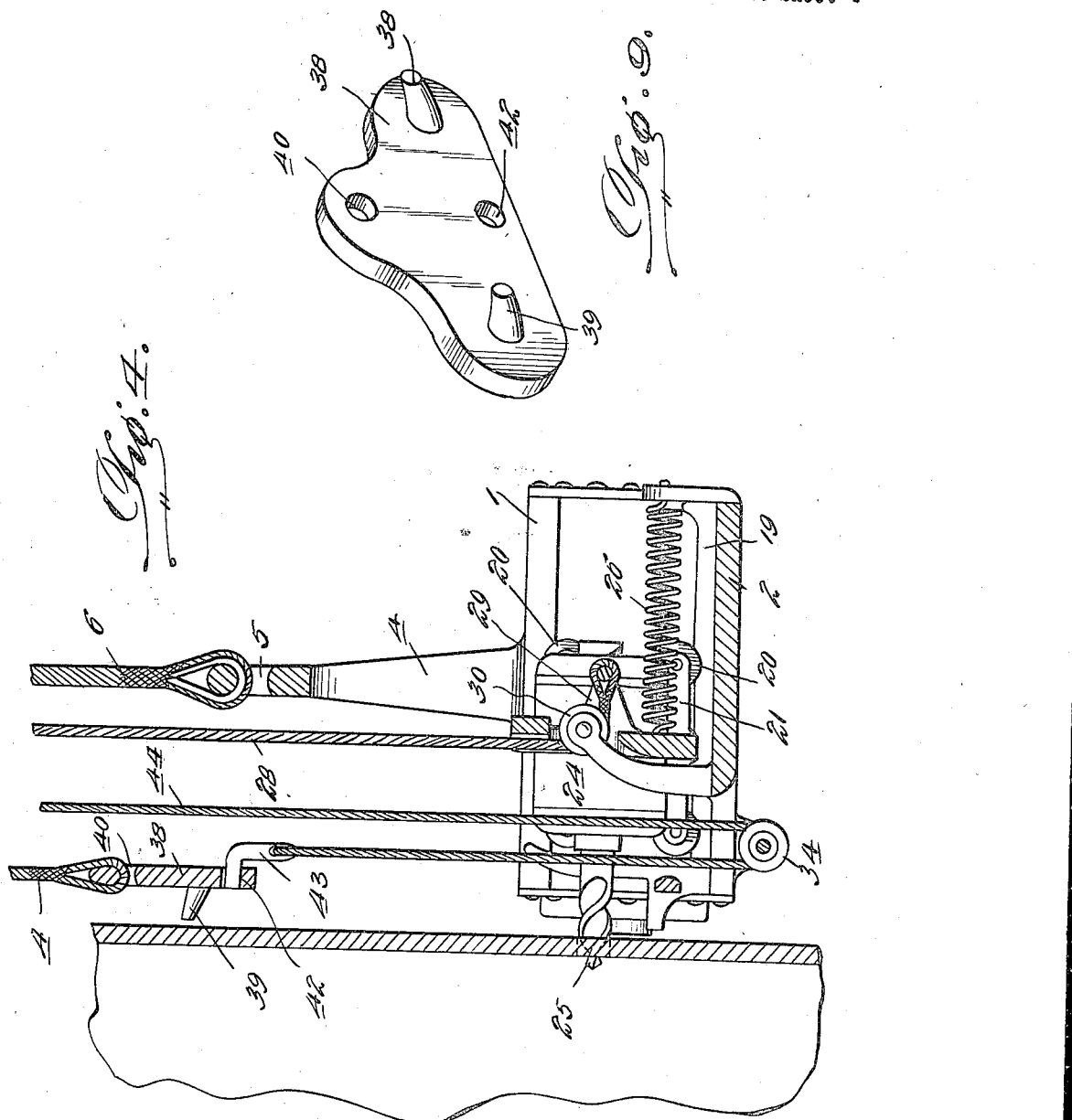
Witnesses:
J. L. Fox,
H. Berman
Inventor
A. F. Andersen
By Clarence A. O'Brien
Attorney Sept. 25, 1923.

A. F. ANDERSEN 1,468,622

SALVAGE APPARATUS FOR RAISING SUNKEN VESSELS

Filed Aug. 10, 1922   6 Sheets-Sheet 5

Inventor
A. F. Andersen,
By Clarence A. O'Brien
Attorney

Witnesses:
F. L. Fox,
H. Berman

Sept. 25, 1923.
A. F. ANDERSEN
1,468,622
SALVAGE APPARATUS FOR RAISING SUNKEN VESSELS
Filed Aug. 10, 1922  6 Sheets-Sheet 6
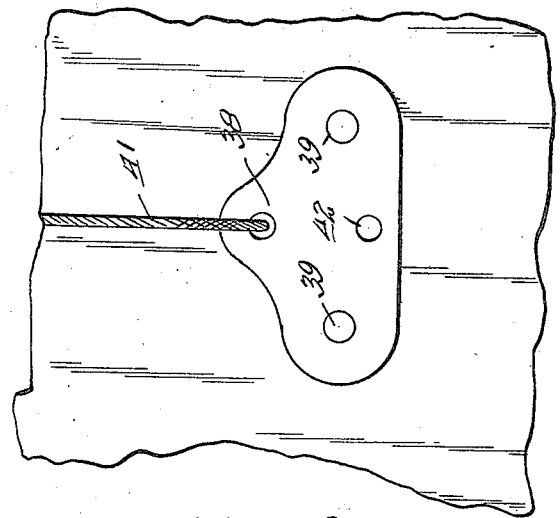
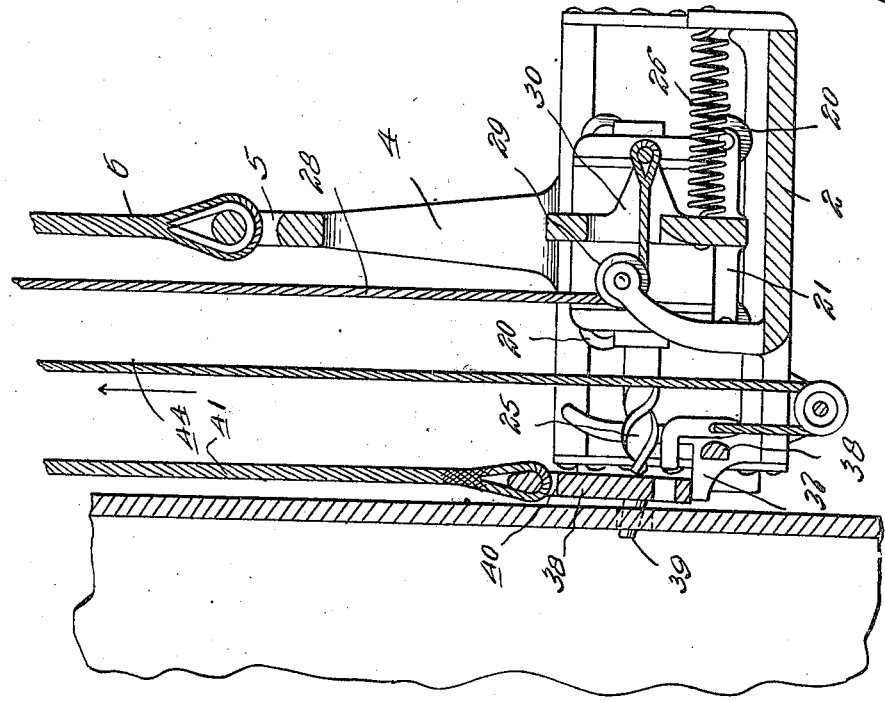
Witnesses:
Inventor
A.F. Andersen
By Clarence A. O'Brien
Attorney Patented Sept. 25, 1923.

1,468,622

UNITED STATES PATENT OFFICE.

AAGE FREDERIK ANDERSEN, OF ROLFE, IOWA.

SALVAGE APPARATUS FOR RAISING SUNKEN VESSELS.

Application filed August 10, 1922. Serial No. 580,968.

*To all whom it may concern:*

Be it known that I, AAGE FREDERIK ANDERSEN, a citizen of the United States, residing at Rolfe, in the county of Pocahontas and State of Iowa, have invented new and useful Improvements in Salvage Apparatus for Raising Sunken Vessels, of which the following is a specification.

In carrying out the present invention it is my purpose to provide a salvage apparatus for raising sunken vessels which may be readily lowered to a position adjacent to the sunken vessel and drawn into engagement with the hull of the vessel and held in such engagement, and whereby openings may be drilled or cut into the hull of the vessel.

It is also my purpose to provide salvage apparatus of the class described whereby hooked lifting plates may be drawn down to the vessel to be salvaged and hooks on such plates engaged with the openings drilled in the hull of the vessel, so that after the desired number of lifting plates have been engaged with the vessel the latter may be pulled to the surface.

A further object of my invention is to improve and simplify the general construction of salvage apparatus for sunken vessels and to provide an apparatus which will embrace the desired features of efficiency and durability, and which may be manufactured and operated at a minimum expense.

Furthermore, I aim to provide salvage apparatus for sunken vessels which will be constructed in such manner that a signal may be given on the surface immediately that the apparatus contacts with the vessel, thereby notifying the operator that the apparatus is in position to drill or cut openings in the hull.

With the above recited objects in view, and others of a similar nature, the invention resides in the construction, combination and arrangement of parts set forth in and falling within the scope of the appended claims.

In the accompanying drawings:

Figure 1 is a front elevation of salvage apparatus constructed in accordance with my invention.

Figure 2 is a horizontal sectional view on the line 2—2 of Figure 1.

Figure 3 is a vertical sectional view through the apparatus showing the same in engagement with the hull of a ship and the drilling motors retracted.

Figure 4 is a view similar to Figure 3 showing the drilling motors in operation.

Figure 5 is a like view showing the drilling motors retracted and the lifting plates in position to engage the side of the vessel.

Figure 6 is a similar view showing the plates engaged with the side of a vessel.

Figure 7 is a fragmentary view showing one of the lifting plates applied to the vessel.

Figure 8 is a vertical sectional view on the line 8—8 of Figure 1, showing one of the holding magnets in cross section.

Figure 9 is a perspective view of one of the lifting plates.

Figure 10 is a diagrammatic view of the signal apparatus.

Referring now to the drawings in detail, 1 designates a hanger which, in the present instance, comprises a bottom plate 2 and housings 3—3 on the upper surface of the bottom plate at the ends of the latter. These housings 3—3 are arranged upon opposite sides of the transverse center line of the bottom plate 2 and connected with the upper surfaces of the housings 3—3 are the ends of an inverted V-shaped hanger bar 4 formed at its apex with an aperture 5 to receive the looped end of a suspending cable 6, by which the hanger may be lowered into the water to a position in proximity to the sunken vessel.

In accordance with my invention each housing 3 is water-tight and carries an electromagnet 7. The pole faces of the magnet 7 project beyond the ends of the housings upon one side of the bottom plate 2, as clearly shown in Figures 1, 2 and 3 of the drawings. These magnets possess great holding power and the pole of each is formed with a recess 8 in which is arranged a signal switch 9. In this instance each signal switch 9 embodies a stationary contact 10 secured to a disk 11 of insulation that is fast in the inner end of the recess 8 and a movable plunger like contact 12 capable of sliding movement within the recess and having its stem projecting through a bushing 13 of insulating material that is threaded into the outer end of the recess. Interposed between the disk 11 and the plunger face of the sliding contact is an expansion spring 14 which acts to hold the contacts normally spaced apart. These contacts are connected in a signal circuit 15 that includes a suitable source of electric energy, as a battery 16 and an audible signal 17. By means of this construction it will be seen that when the plunger is moved inwardly against the action of the spring 14 the signal circuit 15 will be closed and the signal 17 sounded.

The magnets 7 are connected in a suitable control circuit and as the hanger carrying the magnets is lowered into the water and reaches a position that the operator judges to be in the vicinity of the hull of the vessel, the control circuit of the magnets is closed, thereby energizing the latter, and as the poles of the magnets are magnetized the steel hull of the vessel necessarily draws the hanger toward such hull, and when the poles of the magnets engage the hull the hanger is held securely to the hull. As the poles approach the hull of the vessel the switches 9 are closed incident to the plunger stems contacting with the hull of the vessel, and when the switch is closed the signal above the surface of the water is energized, thereby notifying the operator that the apparatus is in proper contact with the vessel.

The confronting faces of the housings 3—3 are formed with longitudinal grooves 18 and the top and bottom surfaces of these grooves are provided with track flanges 19 spaced apart in parallelism. Engaging the track flanges 19 are rollers 20 that are carried by the end frames 21 of a carriage 22. These end frames 21 are connected together by means of a cross piece 23 that is formed with openings spaced apart. It is conceivable, of course, that the carriage 22 may be constructed in any suitable manner.

Within the openings in the cross piece 25 of the carriage are electric motors 24 of any suitable or preferred construction, and these motors are appropriately fastened within the openings so that the possibility of disconnection of the motors from the carriage is minimized.

Suitably connected to the ends of the armature shafts of the motors are drill or cutting bits 25 that project toward the side of the hanger carrying the pole faces of the magnets.

The carriage 22 is normally held at its limit of rearward movement upon the bottom plate 2 by means of a coiled retractile spring 26, one end of which is fastened to the plate or cross piece 23, while the other end is fastened to an arm 27 that extends upwardly from the bottom plate 2. This spring 26 normally holds the motors in inactive or non-drilling position.

In order that the carriage may be moved forwardly so that the drill bits may be engaged with the hull of the vessel after the hanger has been secured to the hull of the vessel, as previously described, suitable means is provided. In the embodiment of my invention selected for illustrative purposes I employ a cable 28, one end of which is connected with a bracket 29 carried by the cross piece 23 and the other end of which is trained over a guide sheave 30 carried by a bracket arm 32 that is secured to the bottom plate 2, the last mentioned end of the cable 28 extending upwardly above the surface of the water and being connected with a suitable control device, whereby a pull may be exerted upon the cable 28 to slide the carriage 22 to drilling position against the action of the spring 26, so that the bits 25 may contact with the hull of the vessel, in order to drill openings in the hull, as clearly illustrated in Figure 4 of the drawings.

In accordance with my invention the bottom plate 2 at its forward edge, that is, the edge adjacent to the hull of the vessel, is formed with a cut-out portion 33 and journaled in this cut-out portion 33 is a guide pulley or sheave 34. Connected to the forward edge of the bottom plate 2 upon opposite sides of the cut-out portion 33 and extending upwardly from the bottom plate are guide arms 35 having their upper ends curved rearwardly, as at 36. These arms 35 adjacent to their lower ends are formed with outwardly extending lips 37 and are connected to each other by a cross bar 38.

So far I have described the hanger for supporting the drilling motors and the mounting of the motors, and I will now proceed to describe the device that is associated with the hanger and by which cables may be connected to the vessel after the holes or openings have been drilled therein by the bits 25. In the present instance, the means by which the cables may be connected to the hull comprises a lifting plate 38 of suitable shape and formed on one face with outwardly extending prongs or hooks 39 spaced apart a distance equal to the distance between the openings drilled in the hull. The upper end of this plate is formed with an opening 40 in which is connected the lower end of a cable 41, while adjacent to its lower edge the plate is formed with an opening 42. This opening 42 is adapted to receive a guide hook 43 that is secured to one end of what might be termed a down haul cable 44. This down haul cable 44 that carries the hook 43 is trained over the guide sheave 34 in the cut-out portion 33 of the plate 2 and the other end of the down haul cable extends above the surface of the water and is connected to a suitable drum or other apparatus.

In practice, the hanger carrying the drilling motors is lowered in position and is secured to the hull of the vessel, as previously described, by the energization of the powerful magnets 7. After the hanger has been placed in position the cable 28 is pulled and the motors 24 energized so that the drill bits 25 will penetrate the hull of the vessel, as shown in Figure 4 of the drawings. After the openings have been drilled in the vessel the tension on the cable 28 is released and the spring 26 reacts to restore the motors to inactive position. With the motors in this position after the drilling operation, a pull is exerted upon the down haul cable 44 and in the downward movement of the cable 44 the lifting plate 38 is drawn downwardly and guided into position by reason of its contacting with the arms 35 and lips 37. As the lower edge of the plate 38 engages the lips 37 the hook 43 upon a further pull pulls out of the opening 42 past the sheave 34 and the down haul cable may be pulled upwardly out of the zone of the apparatus. When the lifting plate 38 is in the position as shown in Figure 5 the cable 28 is again pulled with the motors deenergized, and in the forward movement of the carriage the drill bits engage the rear side of the plate 38 and so force the hooks or prongs 39 into the openings in the hull of the vessel, as clearly shown in Figure 6 of the drawings. The magnets 7 may now be deenergized, thereby relieving the apparatus of the holding influence of said magnets and permitting the hanger and drilling motors to be elevated.

This cycle of operations is carried on until the desired or requisite number of plates 38 have been engaged with the hull of the vessel, and when the proper number of plates are engaged with the hull, then the lifting cables 41 are pulled upwardly, in order to raise the vessel to the surface.

In the event that the hooks 43 fail to disengage the plate 38 when the latter has come to rest upon the lips 37, then in the forward motion of the plate 38 under the action of the drill bits, as in Figure 6, the hook 43 will be disengaged from the plate as shown and may be drawn upwardly.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claim.

Having thus described the invention, what is claimed as new, is:—

In salvaging apparatus for vessels, a hanger adapted to be lowered into the water in proximity to the vessel, electro magnets carried by said hanger and adapted to energize and contact with the hull of the vessel to hold the hangers to the hull, electric motors on said hanger, drill bits carried by said motors, respectively, means for moving said motors on said hanger to facilitate the drilling of openings in the hull by said bits, means associated with said hanger and operable to engage the openings in the hull after the drilling operation whereby the vessel may be lifted, said first named means comprising a wheeled carriage movable transversely of said hanger and a spring connected to said carriage and to said hanger and holding the carriage normally in inactive position.

In testimony whereof I affix my signature.

AAGE FREDERIK ANDERSEN.